United States Patent

Maeda et al.

Patent Number: 6,068,939
Date of Patent: May 30, 2000

[54] COLORED AND FIRED FILM AND METHOD FOR PRODUCING THE SAME

[75] Inventors: Yoshifumi Maeda; Shigehiko Hayashi; Kazuo Goto, all of Hyogo; Jun Kawaguchi; Yasunori Shiraishi, both of Osaka, all of Japan

[73] Assignees: Mitsuboshi Belting Ltd., Hyogo; Nippon Sheet Glass Co., Ltd., Osaka, both of Japan

[21] Appl. No.: 08/974,209

[22] Filed: Nov. 19, 1997

[30] Foreign Application Priority Data

Nov. 21, 1996 [JP] Japan ................................. 8-310392

[51] Int. Cl.[7] ............................... B32B 9/00; B05D 3/02; B05D 1/36

[52] U.S. Cl. ...................... 428/689; 428/542.2; 427/165; 427/205; 427/376.3; 427/376.6; 427/404; 427/419.5; 427/419.6

[58] Field of Search ..................................... 427/165, 205, 427/376.2, 376.3, 376.6, 404, 419.4, 419.5, 419.6; 428/542.2, 542.6, 689, 913.3

[56] References Cited

U.S. PATENT DOCUMENTS

| 4,728,543 | 3/1988 | Kurauchi et al. | 427/407.1 |
| 5,032,429 | 7/1991 | Diefenbach et al. | 427/215 |
| 5,266,361 | 11/1993 | Schwarte et al. | 427/407.1 |

FOREIGN PATENT DOCUMENTS

| 598472 | 5/1994 | European Pat. Off. . |
| 0 699 637 | 3/1996 | European Pat. Off. . |
| 699637 | 3/1996 | European Pat. Off. . |
| 0 739 996 | 10/1996 | European Pat. Off. . |
| 5-270842 | 10/1983 | Japan . |
| 3-34211 | 2/1991 | Japan . |
| 3-273060 | 12/1991 | Japan . |
| 5-270861 | 10/1993 | Japan . |
| 7-25641 | 1/1995 | Japan . |
| 8-259260 | 10/1996 | Japan . |
| 8-283040 | 10/1996 | Japan . |
| 2 116 879 | 10/1983 | United Kingdom . |

OTHER PUBLICATIONS

*A Handbook of Chemistry*, Application vol., Second Revised Edition; Nihon Kagaku–Kai, Maruzen Co., Ltd., p. 890. (English translation of Right Column, Lines 14–32 and Table 11.71).

*Primary Examiner*—Shrive Beck
*Assistant Examiner*—Michael Barr
*Attorney, Agent, or Firm*—Merchant & Gould P.C.

[57] ABSTRACT

A method for producing a colored and fired film formed on a substrate having an improved chemical resistance includes the steps of applying a coloring composition onto a substrate so as to form a film, coating the surface of the film with a coating agent, and firing the film and the coating agent. The coloring composition comprises ultra-fine particles of at least one precious metal selected from the group consisting of Au, Pt, Pd, Rh and Ag, a fixing agent comprising an organic metal compound, a binder resin, a glass network forming component formed of an organic compound containing at least one element selected from the group consisting of Si, B and P, and an organic solvent.

8 Claims, No Drawings

COLORED AND FIRED FILM AND METHOD FOR PRODUCING THE SAME

BACKGROUND OF THE INVENTION

1. Field of the Invention

The present invention relates to a colored and fired film and a method for producing the same. More specifically, the present invention relates to a colored and fired film having excellent chemical resistance formed on a transparent substrate such as a glass plate, and a method for producing the same.

2. Description of the Prior Art

As a method for coloring a surface of a glass substrate, the following method is commonly used. A mixture of glass powder and a coloring agent is applied onto the surface of a glass substrate by printing, and then fired. This method provides an excellent design, because a coloring agent can be applied to the glass substrate as desired. However, light is scattered at the melting interface of the glass powder, so that the parallel transmittance of light is 80% or less. Therefore, this method is not suitable for producing a transparent colored film.

In order to produce a transparent colored film on a glass substrate, several methods have been proposed. One of the methods is referred to as an ion exchange method, in which a specific inorganic salt comprising Ag, Cu and the like is applied to the surface of the glass substrate, and fired. Thereafter, an oxide attached to the surface of the glass substrate is removed by washing. Then, the ultra-fine particles of Ag and Cu in the inorganic salt that have permeated the glass substrate provide colors as colloidal particles. Thus, a transparent colored film is formed on the glass substrate.

Furthermore, according to another method, a sputtering technique is used to form a metal thin film on a glass substrate.

However, the ion exchange method has a drawback in that the kinds of the colors that can be obtained are limited, because the ultra-fine particles are hardly generated by some elements. In addition, the sputtering method is disadvantageous in that the strength of the obtained film is not sufficiently high, a complicated pattern cannot be formed, and a large-scale production apparatus is required.

In view of these problems, a method has been proposed in which a glass coloring composition comprising the ultra-fine particles of a metal, an organic metal compound (a fixing agent), and a binder resin is used for coloring a glass substrate. When using this composition, the requirements for coloring the glass substrate without compromising the transparency are as follows:

(1) To select a solvent in which the ultra-fine particles of the metal can be present stably without being aggregated;

(2) The organic metal compound should be dissolved in the solvent selected in (1), and should not react with the ultra-fine particles of the metal physically or chemically; and (3) The binder resin should be dissolved in the solvent selected in (1), and should not react with the ultra-fine particles of the metal physically or chemically.

More specifically, the following glass coloring compositions are known: a composition obtained by dissolving a polymer complex comprising the ultra-fine particles of gold dispersed in nylon 11, an organic metal compound (cobalt organic acid salt) and a binder resin (nylon 11) in a solvent (cresol); a composition obtained by dissolving the above-mentioned polymer complex, the organic metal compound and a binder resin (cellulose nitrate) in a solvent (carbitol); and a composition obtained by dissolving the above-mentioned polymer complex, the organic metal compound and a binder resin (ethyl cellulose) in a solvent (terpinol). These coloring compositions can color the surface of a glass plate gray in a haze ratio of 3% or less.

Furthermore, Japanese Laid-Open Patent Publication No. 7-25641 disclosed a coloring agent having improved chemical durability by adding a glass network forming component such as silicon alkoxide.

However, a colored film is desired that is hardly affected by acid rain and has a constant transmittance of light and an unchanged tone of color, even if the glass plate has been used outdoor for a long period of time.

SUMMARY OF THE INVENTION

Therefore, with the foregoing in mind, it is the object of the present invention to provide a colored and fired film having further improved chemical resistance and a method for producing the same.

A method for producing a colored and fired film formed on a substrate of the present invention includes the steps of applying a coloring composition onto a substrate so as to form a film, coating the surface of the film with a coating agent, and firing the film and the coating agent. The coloring composition comprises the ultra-fine particles of at least one precious metal selected from the group consisting of Au, Pt, Pd, Rh and Ag, a fixing agent comprising an organic metal compound, a binder resin, a glass network forming component formed of an organic compound containing at least one element selected from the group consisting of Si, B and P, and an organic solvent.

The colored and fired film produced by this production method can have a highly improved chemical resistance so that even if the substrate has dipped in 0.1 normal sulfuric acid at 60° C. for 20 hours, the change in the transmittance of visible light through the film is 2% or less.

These and other advantages of the present invention will become apparent to those skilled in the art upon reading and understanding the following detailed description.

DESCRIPTION OF THE PREFERRED EMBODIMENTS

The ultra-fine particles of a precious metal that is used in the present invention are those of one or more precious metals selected from the group consisting of Au (gold), Pt (platinum), Pd (palladium), Rh (rhodium) and Ag (silver), and they are dispersed independently in a solvent such as α-terpineol, toluene or the like. The diameter thereof is between 1 nm and 100 nm, preferably between 1 nm and 50 nm, and more preferably between 1 nm and 10 nm.

Such ultra-fine particles of the precious metal can be produced, for example, by a method of evaporation in gaseous atmosphere, as disclosed in Japanese Laid-Open Patent Publication No. 3-34211. More specifically, when an inert gas such as helium is introduced to a chamber, and the metal is evaporated, the metal is cooled and condensed by the collision with the inert gas. Thus, ultra-fine particles can be obtained. In this case, it is preferable that a vapor of an organic solvent be introduced while the generated particles are isolated, so as to coat the surfaces of the particles.

The amount of the ultra-fine particles of the precious metal used can be suitably selected depending on the desired transmittance.

It is preferable to add the ultra-fine particles of the precious metal to the coloring composition in the form of a polymer compound in which ultra-fine particles of the precious metal are dispersed in a polymer matrix without being aggregated. This makes it difficult for the ultra-fine particles to aggregate and makes the preservation thereof easy.

Furthermore, the polymer complex that is used in the present invention contains the ultra-fine particles of at least one precious metal selected from the group consisting of Au, Pt, Pd, Rh and Ag in polymers without being aggregated, the ultra-fine particles each having a diameter of 1 nm to 100 nm.

In the case of obtaining the above-mentioned polymer complex, it is necessary to provide the polymers in a thermodynamically nonequilibrated state. More specifically, the polymers can be provided in a thermodynamically nonequilibrated state by the following methods: (1) a pyrolytic process for producing regenerated polymers having a thermodynamically metastable structure by vaporizing polymers as a raw material by pyrolysis in a closed space under a reduced pressure, and solidifying the vapor; (2) a vacuum deposition method in which polymers are heated under a vacuum so as to be melted and evaporated, and thus a polymer layer is solidified on a substrate; and (3) a melting-quenching-solidification method in which polymers are melted at a melting temperature or higher, and introduced immediately to liquid nitrogen or the like to be quenched, and thus a polymer layer is formed on a substrate.

According to the pyrolytic process, a predetermined amount of polymer is introduced and vaporized by pyrolysis. Then, the vapor is aggregated in a heating treatment area so as to produce regenerated polymers. The remaining vapor that is not aggregated in the heating treatment area is aggregated in a cooling area so as to produce oil-like low molecular weight substances. Thus, the paste of the regenerated polymers free of the oil-like low molecular weight substances can be produced.

In the case of the vacuum deposition method, an ordinary vacuum deposition apparatus is used at a vacuum degree of $10^{-4}$ to $10^{-6}$ Torr and a deposition rate of 0.1 to 100 $\mu$m/min, preferably 0.5 to 5 $\mu$m/min, so as to obtain a polymer layer on a substrate such as a glass. In the melting-quenching-solidification method, polymers are melted, and cooled at the critical cooling rate or higher, which is particular to the polymer, so as to obtain a polymer layer. The thus obtained polymer layer is in a thermodynamically unstable and nonequilibrated state, and transforms to an equilibrium state as time elapses.

Examples of the polymer in which the ultra-fine particles of the precious metal are dispersed are nylon 6, nylon 66, nylon 11, nylon 12, nylon 69, polyethylene terephthalate (PET), polyvinyl alcohol, polyphenylene sulfide (PPS), polystyrene (PS), polycarbonate, polymethyl methacrylate or the like. The polymers preferably have a molecular cohesive energy of 2000 cal/mol or more. This type of polymers includes so called crystalline polymers and amorphous polymers. The molecular cohesive energy is specifically defined on page 890 of Chemical Guide, Application edited by the Chemical Society of Japan (published in 1973).

The polymer layer in the thermodynamically nonequilibrated state that is obtained in the above-mentioned methods is subjected to a process of attaching a precious metal layer to the surface thereof. In this process, the precious metal layer is deposited on the polymer layer, for example, by evaporating the precious metal layer onto the polymer layer using a vacuum deposition apparatus, or by attaching a precious metal foil or a precious metal plate to the polymer layer directly.

The complex comprising the precious metal layer and the polymer layer attached to each other is heated at a temperature between the glass transition point and the melting point of the polymer so that the polymer layer can transform to a stable state. As a result, the metal of the precious metal layer diffuses and permeates into the polymer layer in the form of ultra-fine particles having a diameter in the range from 1 nm to 100 nm. The greatest distribution of the particle diameter is preferably in the range from 1 nm to 50 nm. This state lasts until the polymer layer is relaxed completely. The thickness of the precious metal layer attached to the polymer layer is reduced, until the precious metal layer is not present. The ultra-fine particles are distributed in the polymer layer without being aggregated. In this case, the content of the ultra-fine particles is typically 0.01 to 80 wt %. However, the content can be adjusted by changing the production conditions of the polymer layer, or by changing the thickness of the precious metal layer.

In the present invention, the method for producing the polymer complex is not limited to the above-mentioned method, and other methods can be used. For example, the ultra-fine particles of the precious metal are produced by a melting vaporization vapor phase method, a precipitation liquid phase method, a solid phase method, or a dispersion method, and these ultra-fine particles are mechanically mixed with polymers in the from of a solution or a melt. Alternatively, the polymers and the precious metal are evaporated at the same time, and mixed in the vapor phase.

The polymer complex is mixed with and dissolved in an organic solvent such as metacresol, dimethylformamide, formic acid or the like so as to produce a ultra-fine particle dispersed paste in which the ultra-fine particles are dispersed uniformly. Since the ultra-fine particles have small diameters, and interact with the polymers, they are not isolated from the polymers, precipitated, or aggregated to each other in the paste.

The organic solvent can be a solvent selected from the organic solvents shown below, or can be other solvents.

Then, at least a fixing agent, a binder resin, a glass network forming component and an organic solvent are added to the ultra-fine particles of the precious metal or the polymer complex.

Examples of the fixing agent for achieving the object of the present invention include alkoxide such as ethoxide and propoxide, organic acid salts such as naphthenic acid salt, acetate such as silver acetate or the like, and organic complex salts such as an acetylacetone complex salt, an oxine complex salt or the like, each of which comprises a metal such as Al, Si, Ti, Cr, Mn, Fe, Co, Ni, Cu, Y, Zr, Nb, In, Sn, Sb or the like. Specific examples thereof are an Al-acetylacetone salt, a Ti-acetylacetone salt, a Fe-acetylacetone salt, a Cu-acetylacetone salt, a Zr-acetylacetone salt, a Co-acetylacetone salt, a Ti-propoxide, a Fe-propoxide, a Fe-naphthenate, a Co-naphthenate, or the like.

In particular, when the coloring composition obtained by combining the polymer complex containing the ultra-fine particles of gold and the above-mentioned organic metal compound is fired, the obtained tone of color is red for the organic metal compound containing Si, pink for the organic metal compound containing Cu, blue for the organic metal compound containing Ti, green for the organic metal compound containing Fe, gray for the organic metal compound containing Co, blue for the organic metal compound containing Zr, and blue for the organic metal compound containing Ni.

The amount thereof added is not particularly limited, but the mole ratio thereof to the ultra-fine particles of the precious metal is preferably 0.1 or more.

Furthermore, it is preferable to use a binder resin and an organic solvent, because they maintain a suitable viscosity of the coloring composition. The suitable viscosity facilitates the operations during screen printing. Furthermore, the binder resin has the function of retaining the strength of the film of the coloring composition applied onto the print substrate. The binder resin is preferably decomposed at low temperature during firing. In the present invention, for the binder resin and the organic solvent, it is preferable use two types of each.

Examples of the binder resin are a polyamide resin such as nylon 6, nylon 11, nylon 12 or the like, a cellulose resin such as cellulose nitrate, ethyl cellulose, cellulose acetate, butyl cellulose or the like, acrylates such as methylacrylate or the like, polyesters such as polyethylene terephthalate, polycaprolactone, polyethers such as polyoxymethylene or the like, polycarbonates, polyvinyls such as polystyrene, polybutadiene, polyisoprene or the like.

The amount of the binder resin added is determined depending on the viscosity of the coloring composition and a desired degree of the darkness of color.

Furthermore, the glass network forming component is an organic compound containing elements represented by M' (M' is at least one element selected from the group consisting of Si, B and P). This organic compound can improve the strength of a produced film. An organic silicate compound, an organic borate compound or an organic phosphate compound is preferable, and an organic silicate compound such as silicone oil, silicone varnish or the like is more preferable.

More specific examples are tetra i-propoxysilane, polyorganosiloxane, triethyl borate, tristearyl borate, triphenyl borate, tricresyl phosphate, triphenyl phosphate, iproniazide phosphate, diphenyl phosphate, phosphonoacetic acid, phosphoramidon, di-n-butyl phosphate, triethyl phosphate, tri-n-amyl phosphate, or the like.

The glass network forming component not only enhances the strength of the film, but also improves the chemical durability. The addition amount is not particularly limited, but the mole ratio thereof to the fixing agent is preferably between 0.1 and 1000.

Furthermore, as the organic solvent, metacresol, formic acid, chlorophenol, carbitol, terpinol, diacetone alcohol, triethylene glycol or the like can be used.

Furthermore, an antifoaming agent may be added to the coloring composition used in the present invention. Preferable examples of the antifoaming agent are nonpolar oil such as silicone oil typified by polydimethylsiloxane, naphthene oil or paraffin oil. The amount of the antifoaming agent added is preferably 0.05 to 0.5 wt %. The molecular weight of the antifoaming agent is preferably 10 to 10,000. When the molecular weight is less than 10, the antifoaming agent is compatible with the solvent system of the coloring composition readily, thus resulting in the deterioration of the antifoaming property. When the molecular weight exceeds 10,000, the antifoaming effect can be attained with the addition of a trace of the antifoaming agent. However, when the antifoaming agent is added in a large amount, the haze ratio in the colored portion increases, thus resulting in the deterioration of the transparency.

The coloring composition can be obtained by mixing the ultra-fine particles of the precious metal or the polymer complex with an organic solvent in which the fixing agent, the binder resin and the glass network forming component have been dissolved beforehand. Alternatively, it is possible to dissolve the ultra-fine particles of the precious metal or the polymer complex, and the fixing agent, the binder resin and the glass network forming component in an organic solvent simultaneously, and to stir the mixture sufficiently so as to produce the paste of the coloring composition.

The thus produced paste of the coloring composition is printed on a substrate such as a glass plate using a screen so as to form a film.

The printing procedures are as follows. A print substrate (glass) is disposed several millimeters below a horizontally disposed screen (e.g., a polyester plain weave fabric of 255 mesh). The coloring composition is placed on the screen, and then is spread on the entire screen using a squeegee. At this time, the screen is spaced away from the print substrate. Then, the screen is moved by pressing the screen with the squeegee until the screen is in contact with the print substrate. This is the end of one operation of printing. Thereafter, this operation is repeated.

Then, the printed substrate is allowed to stand in an atmosphere whose temperature is 100 to 200° C. for 10 minutes so as to remove the organic solvent. Alternatively, the organic solvent is removed and dried by degassing a sealed container where the print substrate is held.

Furthermore, the film of the coloring composition is coated with a coating agent. The coating agent is provided in the form of a solution having a suitable viscosity for printing obtained by dissolving a high-molecular compound alone or the mixture of a high-molecular compound and an organic metal compound in an organic solvent. The film can be coated with the coating agent by the screen printing method or other methods.

The high-molecular compound contained in the coating agent preferably has a molecular weight in the range that can be dissolved in a solvent.

The high-molecular compound contained in the coating agent is preferably a thermoplastic resin.

The high-molecular compound that can be used for the coating agent is preferably at least one resin selected from the group consisting of a cellulose resin such as cellulose nitrate, ethyl cellulose, cellulose acetate, butyl cellulose or the like, a polyamide resin such as nylon 6, nylon 11, nylon 12 or the like, an acrylic resin, a polyester resin and a polystyrene resin.

Furthermore, as the organic solvent, any solvent can be used, as long as it dissolves the resin as described above. Examples thereof include metacresol, formic acid, chlorophenol, carbitol, terpinol, diacetone alcohol, triethylene glycol, isopropyl alcohol, tetrahydrofurfuryl alcohol or the like.

Furthermore, examples of the organic metal compound to be contained in the coating agent include alkoxide, an organic acid salt, and polysiloxane, each of which comprises Si, Ti, B or the like. Specific examples are titanium stearate, silicone oil or the like.

The coating agent coated on the film is allowed to stand in the atmosphere of 100 to 200° C. for 10 minutes so that the organic solvent is removed. Alternatively, the organic solvent is removed and dried by degassing the sealed container where the substrate with the coating agent is placed. Thereafter, the film of the coloring composition coated with the coating agent is subjected to a heat treatment for a few minutes at 300 to 800° C. so as to be fired. In the case where the coating agent is formed without any organic metal compound, no coating agent remains after firing. The temperature of the firing is more preferably 400 to 650° C.

In the present invention, the tone of color by reflected light can be changed as described above, and thus the reflectance of the colored film can be changed. Therefore, when the coating agent is applied to a desired portion by screen printing, and fired, a decorative glass utilizing reflected light can be produced.

EXAMPLES

Hereinafter, the present invention will be specifically described by way of examples.

Examples 1 to 9, Comparative Example 1
(Production of regenerated polymer)

Pellets of nylon 11 were used as the polymer material. First, 90 g of pellets were added to a raw material container of the apparatus for treating the polymer. The apparatus was set as follows. The heating region in the pyrolysis section was heated to 525±1° C. beforehand, and the temperature of the heating region in the heat treatment area was set to 180±5° C. Furthermore, a first cooling area was cooled by water having a temperature of 25° C., and a second cooling area was cooled by a liquid nitrogen. Then, the pyrolysis section, the heat treatment area, the first cooling area and the second cooling area were put under a reduced pressure of about $10^{-2}$ to $10^{-3}$ Torr.

When about 7 g of pellets were placed in the pyrolysis section, the pellets were vaporized, and were aggregated in the heat treatment area. Then, liquid oil pooled in the first cooling area and the second cooling area. This procedure was repeated continuously until no more pellets were left in the raw material storage, which took 90 minutes.

When the low molecular weight nylon 11 collected in the heat treatment area and the oil-like low molecular weight substance were measured for the molecular weight with gel permeation chromatography (600E manufactured by Nihon Waters K.K), the molecular weights were between 619 and 633 and between 250 and 350, respectively.

The measurement was performed as follows. First, each sample was dissolved in chloroform. The mixture was placed in a column (Shodex GPCAC-801+AC-802) at a flow rate of 1.0 ml/min at a temperature of 35° C., and measured by a detector (UV: 254 nm).

Then, a predetermined amount of nylon 11 pellets was added to the regenerated nylon 11 obtained in the heat treatment area, and metacresol was added thereto. The mixture was passed through ink rolls twice so as to make the mixture into a paste.

The paste of the regenerated polymers was printed on the glass substrate by the screen printing as described above, dried at 80° C. for 5 minutes, and thus a film having a thickness of 5 μm was produced.
(Production of polymer complex)

The obtained film was positioned in a vacuum deposition apparatus, and gold chips were placed in a hearth and heated by electronic beams. In this manner, deposition was effected under a vacuum of $10^{-4}$ to $10^{-6}$ Torr so that a gold film was deposited on the polymer layer. This was taken out from the vacuum deposition apparatus, and was allowed to stand in a constant temperature bath of 100° C. for 10 minutes, and thus a polymer complex in which the ultra-fine particles of the gold were dispersed was produced.

The obtained polymer complex and cresol were mixed at a weight ratio of 1:1, so as to prepare a solution of the polymer complex.

Then, additives shown in Table 1 were added thereto, so as to obtain a coloring composition. The coloring composition was printed on a glass substrate by the screen printing, and dried at 120° C. for 10 minutes, and thus a film was formed on the glass substrate.

For the screen printing, an automatic printing machine was used. As a printing block to be printed on, an aluminum frame of 300 mm×400 mm with a plain weave fabric attached thereto was used. The plain weave fabric was made of polyester, and had #330 meshes with an all over painted pattern of 100 mm×100 mm. The squeegee was made of polyurethane having a shore A hardness of 70°, and the angle to the printing block was set at 60°. The screen was spaced away from the substrate by 3 mm.

TABLE 1

| Coloring composition | (wt %) |
| --- | --- |
| Gold-nylon complex material (Gold concentration : 20 wt %) | 5 |
| Fixing agent (Ti-acetylacetone salt) | 7.5 |
| Fixing agent (silver acetate) | 0.5 |
| Glass network forming component (denatured polyornanosiloxane) | 0.25 |
| Binder resin (ethyl cellulose) | 4.10 |
| Organic solvent (terpinol) | 77.65 |
| Organic solvent (metacresol) | 5 |

Furthermore, the thus produced film was coated with a coating agent by the screen printing as described above. The coating agent was formed of a solution containing the high-molecular compounds dissolved in the organic solvent as shown in Table 2. This sample was fired in a furnace at 650° C. for 10 minutes, and thus a transparent fired film was formed on the glass substrate.

In the Comparative Example, the film was not coated with the coating agent and fired under the same conditions as in the Examples.

A chemical resistance test was performed in the following manner. The fired film was dipped in an aqueous solution of 0.1 normal $H_2SO_4$ at 60° C. for 20 hours, and then the optical properties such as the haze ratio, the transmittance of visible light, the tone of color of the fired film were evaluated to determine a change after dipping using a turbidity meter, a color-difference meter and the like. The results are shown in Table 2.

TABLE 2

| | Compositions of coating agent | | | Optical property | | |
| --- | --- | --- | --- | --- | --- | --- |
| | High-molecular compound | Organic solvent | Organic metal compound (concentration wt %) | Transmittance of visible light (ΔTT %) | Change in tone of color (ΔE*ab) | Haze ratio (ΔHz %) |
| Ex.1 | ethyl cellulose | terpinol | — | 0.11 | 0.40 | 0.4 |
| Ex.2 | ethyl cellulose | carbitol | — | −0.16 | 0.69 | 0.5 |
| Ex.3 | ethyl cellulose | tetrahydro furfuryl alcohol | — | −0.39 | 0.13 | 0.4 |
| Ex.4 | ethyl cellulose | isopropyl alcohol | — | 0.15 | 0.98 | 0.5 |
| Ex.5 | nylon 11 | metacresol | — | 0.02 | 0.56 | 0.4 |
| Ex.6 | acetyl-cellulose | tetrafuryl alcohol | — | −0.18 | 0.56 | 0.4 |
| Ex.7 | acrylic resin | isopropyl alcohol | — | −0.19 | 0.50 | 0.5 |

TABLE 2-continued

| | Compositions of coating agent | | | Optical property | | |
|---|---|---|---|---|---|---|
| | High-molecular compound | Organic solvent | Organic metal compound (concentration wt %) | Transmittance of visible light (ΔTT %) | Change in tone of color (ΔE*ab) | Haze ratio (ΔHz %) |
| Ex.8 | ethyl cellulose | tetrahydro furfuryl alcohol | silicone oil (1) | 0.10 | 0.49 | 0.3 |
| Ex.9 | ethyl cellulose | tetrahydro furfuryl alcohol | titanium stearate (1) | 0.05 | 0.67 | 0.3 |
| Comparative Ex.1 | none | none | — | 2.4 | 2.5 | 0.3 |

(where, the values of the change in tone of color are obtained as a result of the evaluation based on the L*a*b* colorimetric system (CIE 1976 L*a*b* Diagram); $\Delta E^*ab=[(\Delta L^*)^2+(\Delta a^*)^2+(\Delta b^*)^2]^{1/2}$).

The results in Table 2 indicate that the colored and fired films of Examples have smaller changes in the transmittance (ΔTT≦2%) and the tone of color (ΔE*ab≦2%) in the chemical resistance test, compared with those of Comparative Example 1. Thus, the improvement of the chemical resistance is confirmed.

In Examples 1 to 7, even if the coating agent is not present after firing, the chemical resistance is improved. This is believed to be because the composition of the surface of the colored and fired film is changed and the durability is improved, or the film becomes dense.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A method for producing a colored and fired film formed on a substrate, the method comprising the steps of:
    applying a coloring composition onto a substrate so as to form a film, the coloring composition comprising ultra-fine particles of at least one precious metal selected from the group consisting of Au, Pt, Pd, Rh and Ag, a fixing agent comprising an organic metal compound, a binder resin, a glass network forming component formed of an organic compound containing at least one element selected from the group consisting of Si, B and P, and an organic solvent;
    coating the surface of the film with a coating agent before firing the film, the coating agent being provided in the form of a solution comprising a thermoplastic resin and an organic solvent; and
    firing the film with the coating agent at a temperature from 300° C. to 800° C.,
    wherein the coating agent does not remain on the film after firing.

2. A method for producing a colored and fired film according to claim 1, wherein the coloring composition comprises a polymer complex in which the precious metal is dispersed in a polymer.

3. A method for producing a colored and fired film according to claim 1, wherein the thermoplastic resin contained in the coating agent is at least one resin selected from the group consisting of a cellulose resin, a polyamide resin, an acrylic resin, a polyester resin and a polystyrene resin.

4. method for producing a colored and fired film according to claim 1, wherein the glass network forming component is an organic silicate compound.

5. A method for producing a colored and fired film according to claim 1, wherein the glass network forming component is contained at a mole ratio to the fixing agent in the range from 0.1 to 1000.

6. A method for producing a colored and fired film according to claim 1, wherein the ultra-fine particles have a diameter of 1 nm to 100 nm.

7. A method for producing a colored and fired film according to claim 1, wherein a chemical resistance of the colored and fired film is improved by firing the film with the coating agent to an extent that if the colored and fired film is dipped in 0.1 normal sulfuric acid at 60° C. for 20 hours, a change in a transmittance of visible light through the colored and fired film is 2% or less.

8. A colored and fired film formed on a substrate, the colored and fired film obtainable by a process comprising the steps of:
    applying a coloring composition onto a substrate so as to form a film, the coloring composition comprising ultra-fine particles of at least one precious metal selected from the group consisting of Au, Pt, Pd, Rh and Ag, a fixing agent comprising an organic metal compound, a binder resin, a glass network forming component formed of an organic compound containing at least one element selected from the group consisting of Si, B and P, and an organic solvent;
    coating the surface of the film with a coating agent before firing the film, the coating agent being provided in the form of a solution comprising a thermoplastic resin and an organic solvent; and
    firing the film with the coating agent at a temperature from 300° C. to 800° C.,
    wherein the coating agent does not remain on the film after firing,
    wherein a chemical resistance of the colored and fired film is improved by firing the film with the coating agent to an extent that if the colored and fired film is dipped in 0.1 normal sulfuric acid at 60° C. for 20 hours, a change in a transmittance of visible light through the colored and fired film is 2% or less.

* * * * *